Aug. 15, 1944. F. F. FISHER 2,355,852

TUBE EXPANDING TOOL

Filed June 8, 1943

INVENTOR.
FRANK F. FISHER
BY
*Whittemore Hulbert & Belknap*
ATTORNEYS

Patented Aug. 15, 1944

2,355,852

UNITED STATES PATENT OFFICE 2,355,852

TUBE EXPANDING TOOL

Frank F. Fisher, Detroit, Mich.

Application June 8, 1943, Serial No. 490,056

7 Claims. (Cl. 153—82)

The invention relates to tools of that type having rotary work engaging members and refers more particularly to tools for expanding tubes.

The invention has for one of its objects to provide an improved tool by means of which a better product can be secured in less time and with unskilled labor.

The invention has for a further object to provide an improved tool for fastening tubes into tube holes of tube sheets, drums and headers by expanding or rolling in the tubes uniformly by controlling the energy input to the tool and by also controlling the operation of the mechanism which controls the energy input.

These and other objects of the invention will become apparent from the following description when taken in connection with the accompanying drawing, in which Figure 1 is a diagrammatic side elevation of a tool embodying the invention;

Figure 1:
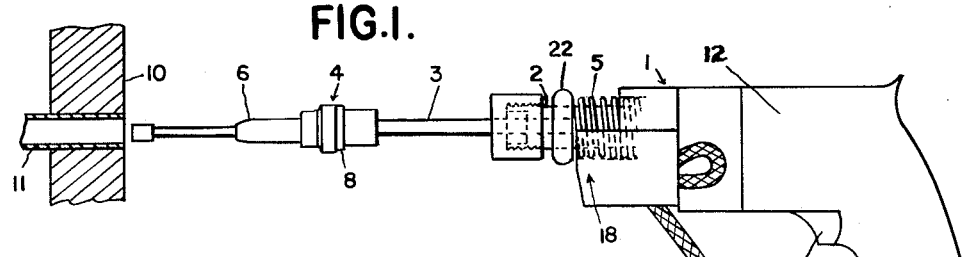
Figure 2:
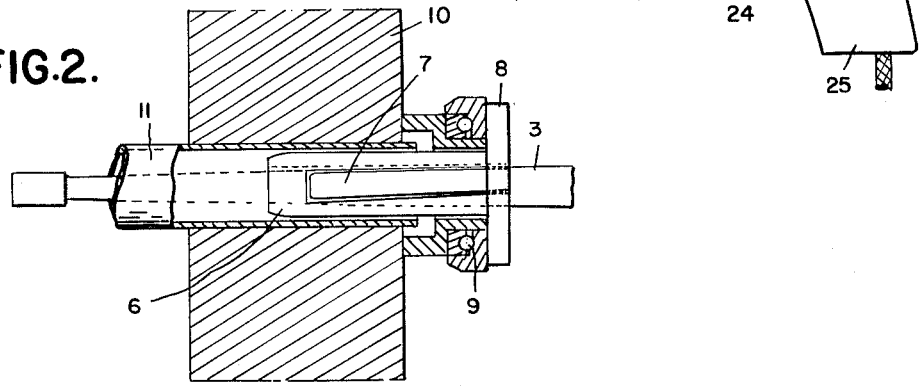
Figure 2 is an enlarged cross section of a portion thereof.

The tool illustrated in the present instance is designed to fasten tubes into tube holes of tube sheets, drums and headers by expanding or rolling in the tubes, but it may have other uses such, for example, as tapping holes. The tool comprises the support 1, the rotatable spindle 2, the tapered mandrel 3 secured to the outer end of the spindle, and the expanding mechanism 4 freely mounted on the mandrel. The spindle is longitudinally movably mounted in the support and is normally held in its outermost position by suitable means, such as the coil spring 5. The expanding mechanism comprises the cage 6 rotatable on the mandrel and the angularly spaced rollers 7 mounted in the cage and engaging the mandrel and inclined to the axes of the cage and mandrel to secure a self-feeding action. The cage has mounted on its end nearest the support 1 the stop collar 8 which is preferably provided with the anti-friction thrust bearing 9 which is adapted to abut the work piece 10, such as a tube sheet, having a tube hole for receiving the work piece 11, such as a tube, which is to be fastened to the tube sheet. 12 is an electric motor having its housing secured to the support 1 and its rotor connected to the spindle 2 by suitable gear and clutch mechanism to rotate the spindle in opposite directions in the two different positions of longitudinal movement of the spindle in the support. The tool, as thus far described, is of standard construction such, for example, as the tool illustrated in the patent to L. F. Meunier, No. 1,739,980, issued Dec. 17, 1929.

To control the operation of the motor, there is the current limiting relay 13 in the motor circuit 14 leading from the supply line 15. The other supply line 16 is connected directly to the motor. The relay is of standard construction and, as shown, its operation is controlled by the solenoid 17. The relay is normally closed to close the motor circuit until a predetermined value of current passes through the motor and the motor circuit, including the relay, and opens when the current increases beyond the predetermined value to thereby open the motor circuit and disconnect the motor from the supply line 15.

To provide full line current for starting the motor prior to rolling in the tube and also to provide full line current for the backing out of the expanding mechanism after the rolling in of the tube I have provided with the auxiliary switch 18 in the motor circuit. This switch comprises the resilient contact 19 connected to the supply line 15 and engageable with the stationary contacts 20 and 21. The stationary contact 20 is located in the motor circuit 14 between the motor 12 and the current limiting relay 13 so that in the normal position of the auxiliary switch the current limiting relay is disconnected from the motor circuit and the full line current passes through the motor. The stationary contact 21 leads to the current limiting relay 13 so that when the movable contact 19 engages the stationary contact 21 the current limiting relay is connected to the motor circuit and all of the current passes through the relay and the motor. To operate the auxiliary switch, I have provided upon the spindle 2 the collar 22 which is adapted to engage the finger 23 upon the movable contact 19 to move the same out of engagement with the stationary contact 20 and into engagement with the stationary contact 21. The collar 22 also serves as an abutment for the coil spring 5.

Figure 3:
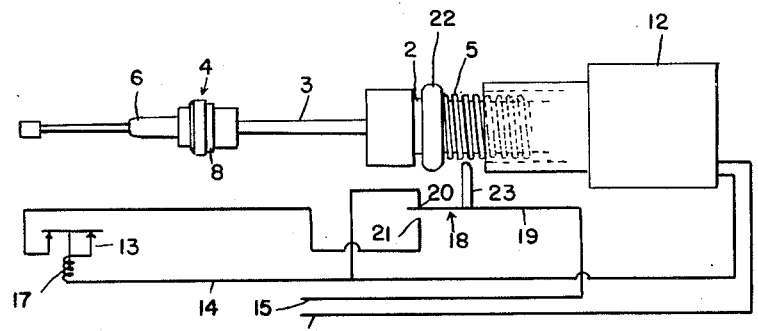
Figures 3 and 4 are diagrammatic views illustrating the method of operation.
Figure 4:
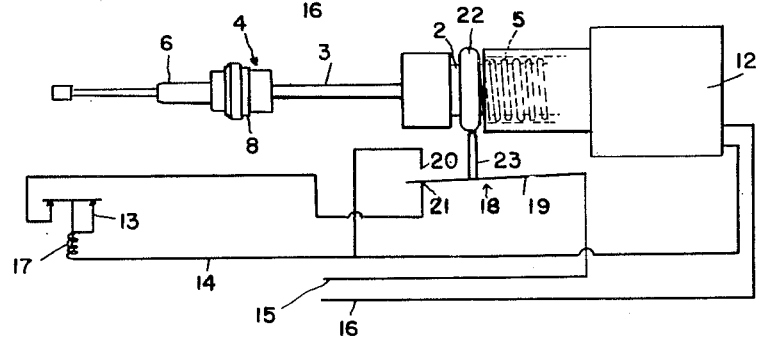

In the normal position of the parts, as illustrated in Figure 3, the spindle 2 is held in its advanced position by means of the coil spring 5, at which time the collar 22 clears the finger 23 and the movable contact 19 because of its inherent resiliency engages the stationary contact 20 so that the current limiting relay is disconnected from the motor circuit. As a result, when the current is turned on the full line current passes through the motor 12. In the present instance, the current is turned on by depressing the trigger 24 which is carried by the grip 25 secured to the rear of the motor housing 12, the trigger and grip forming part of the standard construction of tool. After the motor has been started the expanding mechanism 4 is inserted into the end portion of the tube 11 extending within a hole in the tube sheet 10 until the anti-friction thrust bearing 9 abuts the tube sheet. Upon continued movement of the tool relative to the tube sheet, the mandrel 3 causes the rollers 7 to engage the inside of the tube and, as a result, the support 1 and its associated parts are moved longitudinally relative to the spindle 2 against the effort exerted by the coil spring 5 to bring the collar 22 into contact with the finger 23 and to thereby depress the movable contact 19 and connect the current limiting relay 13 into the motor circuit 14, as illustrated in Figure 4. At the same time and by reason of the frame and spindle having moved longitudinally relative to each other, the direction of rotation of the spindle is changed by the gear and clutch mechanism, such as illustrated in the Meunier Patent No. 1,739,980, so that the expanding mechanism self-feeds into the end portion of the tube to expand the same. As the end portion of the tube is expanded, resistance to expansion offered by the tube and the tube sheet increases with the degree of expansion until a predetermined degree of expansion is reached so that any further increase of resistance raises the current for driving the motor above the current limiting relay setting. As a result, the current limiting relay opens the motor circuit. Since the expansion of the tube in the tube sheet results in elongation of the tube, as set forth in the F. F. Fisher Patent No. 2,041,915, the elongation of the tube may be used in determining the initial setting of the relay. When the motor circuit opens, the operator immediately pulls the tool away from the tube and during the initial part of this movement the actuating collar on the spindle becomes released from the finger of the auxiliary switch to allow the latter to assume its normal position making the motor circuit with the current limiting relay disconnected. This operation takes place in a relatively short time so that the motor does not stop and the tool is ready for operation upon another tube.

From the above description, it will be seen that I have provided an improved tool for making a better product because it is uniformly operated on by reason of using a predetermined value of energy input. It will be seen also that the time for making the product is much less than that heretofore required, and an unskilled operator may be employed.

What I claim as my invention is:

1. In a tool for expanding a tube in a tube hole, the combination with a support, rotatable mechanism movable longitudinally relative to said support for expanding the tube, and means for rotating said mechanism comprising an electric motor, of a current limiting relay in the motor circuit, and means in the motor circuit controlled by said mechanism in the different positions of longitudinal movement thereof relative to said support to disconnect and connect said relay in the motor circuit.

2. In a tool movable toward and into engagement with work, the combination with a support, rotatable mechanism operable on the work and movable longitudinally relative to said support, and means for rotating said mechanism comprising an electric motor, of a current limiting relay in the motor circuit, and means in the motor circuit controlled by said mechanism in the different positions of longitudinal movement thereof relative to said support to disconnect and connect the relay in the motor circuit.

3. In a tool relatively movable toward and away from work, the combination with mechanism operable on the work, and means for rotating said mechanism comprising an electric motor, of a current limiting relay in the motor circuit, and means in the motor circuit depending for its operation upon the relative position of the tool and work and operable to disconnect and connect the relay in the motor circuit.

4. In a tool for expanding a tube in a tube hole, the combination with expanding rollers, a tapered mandrel acting on said rollers, and an electric motor for driving said mandrel, of a current limiting relay in the motor circuit, an auxiliary switch in the motor circuit for connecting and disconnecting said relay, and means movable with said mandrel for controlling the operation of said switch to disconnect said relay during the initial and final stages of operation of the tool and to connect said relay during the intermediate stage.

5. In a tool for expanding a tube in a tube hole, the combination with a support, a longitudinally movable rotatable spindle in said support normally held in a predetermined longitudinal position relative to said support, mechanism rotated by said spindle for expanding the tube, and an electric motor on said support connected to said spindle, of a current limiting relay in the motor circuit, and an auxiliary switch in the motor circuit for connecting and disconnecting said relay, said auxiliary switch being actuable by said spindle.

6. In a tool for expanding a tube in a tube hole, the combination with a support, a longitudinally movable rotatable spindle in said support normally held in a predetermined longitudinal position relative to said support, mechanism rotated by said spindle for expanding the tube, and an electric motor on said support connected to said spindle, of a current limiting relay in the motor circuit, an auxiliary switch in the motor circuit for connecting and disconnecting said relay, and means movable upon longitudinal movement of said spindle for actuating said auxiliary switch.

7. In a tool for expanding a tube in a tube hole, the combination with a support, an electric motor on said support, a longitudinally movable spindle in said support, mechanism rotatable by said spindle and insertable into the tube for expanding the tube, said spindle in one predetermined longitudinal position relative to said support being rotatable by said motor to drive said mechanism to thereby expand the tube, said spindle in another predetermined longitudinal position relative to said support being rotatable by said motor in the reverse direction to provide for removal of said mechanism from the tube, of a current limiting relay in the motor circuit, and an auxiliary switch on the support in the motor circuit for connecting and disconnecting said relay, said auxiliary switch being actuable by longitudinal movement of said spindle.

FRANK F. FISHER.